(12) United States Patent
Watnik et al.

(10) Patent No.: US 12,432,452 B2
(45) Date of Patent: Sep. 30, 2025

(54) METHODS AND APPARATUSES FOR WAVEFRONT RECONSTRUCTION

(71) Applicant: The Government of the United States, as represented by the Secretary of the Navy, Washington, DC (US)

(72) Inventors: Abbie Watnik, Washington, DC (US); Dennis Gardner, Washington, DC (US); Theodore DuBose, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 442 days.

(21) Appl. No.: 17/686,973

(22) Filed: Mar. 4, 2022

(65) Prior Publication Data
US 2022/0286616 A1  Sep. 8, 2022

Related U.S. Application Data

(60) Provisional application No. 63/156,556, filed on Mar. 4, 2021.

(51) Int. Cl.
*H04N 23/55* (2023.01)
*H04N 23/68* (2023.01)

(52) U.S. Cl.
CPC ....... *H04N 23/687* (2023.01); *H04N 23/6812* (2023.01)

(58) Field of Classification Search
CPC .... H04N 23/68; H04N 23/681; H04N 23/685; H04N 23/687; H04N 23/6812; G06T 2207/20084; G06V 10/82; G06N 3/0455; G06N 3/0464; G06N 3/02; G06N 3/045; G06N 3/04
See application file for complete search history.

(56) References Cited

U.S. PATENT DOCUMENTS 6,497,483 B2 * 12/2002 Frey .................. A61B 3/158
                                                        351/212
7,457,545 B2   11/2008 Wirth et al.
(Continued)

FOREIGN PATENT DOCUMENTS

WO   WO-2018083573 A1 *  5/2018  ............. G01J 9/00

OTHER PUBLICATIONS

Swanson et al. "Wavefront reconstruction and prediction with convolutional neural networks." Adaptive Optics Systems VI. vol. 10703. SPIE, 2018. (Year: 2018).*
(Continued)

*Primary Examiner* — Sumati Lefkowitz
*Assistant Examiner* — Michael Adam Shariff
(74) *Attorney, Agent, or Firm* — US Naval Research Laboratory

(57) ABSTRACT

A system and method for correcting distorted wavefronts is provided. A wavefront sensor, or an image sensor, receives a distorted wavefront and generates intensity data, x-slope data, and y-slope data corresponding to the distorted wavefront. A controller receives the intensity data, x-slope data, and y-slope data from the wavefront sensor and generates a reconstructed wavefront using a trained neural network based on the intensity data, x-slope data, and y-slope data.

11 Claims, 16 Drawing Sheets

(56) References Cited

U.S. PATENT DOCUMENTS

| | | |
|---|---|---|
| 9,091,862 B2 | 7/2015 | Mertz et al. |
| 2012/0296591 A1 | 11/2012 | Ohkubo et al. |
| 2019/0188834 A1* | 6/2019 | Zelenka .................... G06T 5/73 |

OTHER PUBLICATIONS

Dubose et al. "Intensity-enhanced deep network wavefront reconstruction in Shack-Hartmann sensors"; Optics Letters 45.7: 1699-1702 (Year: 2020).*
W. H. Southwell, "Wave-front estimation from wave-front slope measurements," Journal of the Optical Society of America 70, 998-1006 (1980).
J. D. Barchers, D. L. Fried, and D. J. Link, "Evaluation of the performance of hartmann sensors in strong scintillation," Applied Optics 41, 1012-1021 (2002).
V. Akondi, S. Steven, and A. Dubra, "Centroid error due to non-uniform lenslet illumination in the shack-hartmann wavefront sensor," Optics Letters 44, 4167-4170 (2019).
D. L. Fried, "Branch point problem in adaptive optics," Journal of the Optical Society of America A 15, 2759-2768 (1998).
B. Pathak and B. R. Boruah, "Improved wavefront reconstruction algorithm for shack-hartmann type wavefront sensors," Journal of Optics 16, 055403 (2014).
M. Aubailly and M. A. Vorontsov, "Scintillation resistant wavefront sensing based on multi-aperture phase reconstruction technique," Journal of the Optical Society of America A 29, 1707-1716 (2012).
A. Krizhevsky, I. Sutskever, and G. E. Hinton, "Imagenet classification with deep convolutional neural networks," in Advances in Neural Information Processing Systems 25, (Curran Associates, Inc., 2012), pp. 1097-1105.
H. Noh, S. Hong, and B. Han, "Learning deconvolution network for semantic segmentation," in Proceedings of the IEEE International Conference on Computer Vision (ICCV), (2015), pp. 1520-1528.
O. Ronneberger, p. Fischer, and T. Brox, "U-net: Convolutional networks for biomedical image segmentation," in International Conference on Medical Image Computing and Computer-assisted Intervention, (Springer, 2015), pp. 234-241.
X. Mao, C. Shen, and Y.-B. Yang, "Image restoration using very deep convolutional encoder-decoder networks with symmetric skip connections," in Advances in Neural Information Processing Systems 29, (Curran Associates, Inc., 2016), pp. 2802-2810.
S. Li, M. Deng, J. Lee, A. Sinha, and G. Barbastathis, "Imaging through glass diffusers using densely connected convolutional networks," Optica 5, 803-813 (2018).
A. Sinha, J. Lee, S. Li, and G. Barbastathis, "Lensless computational imaging through deep learning," Optica 4, 1117-1125 (2017).
Y. Rivenson, Y. Zhang, H. Günaydn, D. Teng, and A. Ozcan, "Phase recovery and holographic image reconstruction using deep learning in neural networks," Light: Science & Applications 7, 17141 (2018).
S. W. Paine and J. R. Fienup, "Machine learning for improved image-based wavefront sensing," Optics Letters 43, 1235-1238 (2018).
Y. Wu, Y. Luo, G. Chaudhari, Y. Rivenson, A. Calis, K. de Haan, and A. Ozcan, "Bright-field holography: Cross-modality deep learning enables snapshot 3d imaging with bright-field contrast using a single hologram," Light: Science & Applications 8, 25 (2019).
R. Swanson, M. Lamb, C. Correia, S. Sivanandam, and K. Kutulakos, "Wavefront reconstruction and prediction with convolutional neural networks," Proceedings of SPIE 10703, 107031F (2018).
G. Huang, Z. Liu, L. van der Maaten, and K. Q. Weinberger, "Densely connected convolutional networks," in Proceedings of the IEEE Conference on Computer Vision and Pattern Recognition, (IEEE, 2017), pp. 4700-4708.
R. Lane, A. Glindemann, and J. Dainty, "Simulation of a kolmogorov phase screen," Waves in Random Media 2, 209-224 (1992).
R. M. Goldstein, H. A. Zebker, and C. L. Werner, "Satellite radar interferometry: Two-dimensional phase unwrapping," Radio Science 23, 713-720 (1988).
M. Abadi, P. Barham, J. Chen, Z. Chen, A. Davis, J. Dean, M. Devin, S. Ghemawat, G. Irving, M. Isard, M. Kudlur, J. Levenberg, R. Monga, S. Moore, D. G. Murray, B. Steiner, P. Tucker, V. Vasudevan, P. Warden, M. Wicke, Y. Yu, and X. Zheng, "Tensorflow: A system for large-scale machine learning," in 12th USENIX Symposium on Operating Systems Design and Implementation (OSDI 16), (USENIX Association, 2016), pp. 265-283.

* cited by examiner

METHODS AND APPARATUSES FOR WAVEFRONT RECONSTRUCTION

BACKGROUND

Field of the Invention

The present application relates generally to methods and apparatuses for wavefront reconstruction.

Description of Related Art

The field of digital imaging has seen rapid growth in the past twenty-years. It is now common to find digital image sensors in cameras, smartphones, and other devices where a user may wish to capture an image. For much of the "digital image" era, improved image quality scaled with improvement in the digital image sensor. Larger pixel sizes, increased megapixel numbers, and high quality optics were the key to superior images. However, factors outside the camera also influence image quality. For example, air turbulence can cause distorted images. FIGS. 1A and 1B are exemplary. FIG. 1A shows an image of a vehicle where air turbulence between the vehicle and the image sensor has distorted the incoming wavefront. As a result, a blurry image is recorded. FIG. 1B shows the same image in perfect optical conditions, i.e., where there is little or no turbulence between the vehicle and the image sensor.

The field of adaptive optics aims to develop tools and techniques to account for external factors that can affect image quality, such as air turbulence. A popular tool in the field of adaptive optics is a Shack-Hartmann wavefront sensor (SH-WFS). An SH-WFS operates by focusing an incident wavefront onto a two-dimensional image sensor through a lenslet array, producing an array of focused spots. FIG. 2 is exemplary.

In FIG. 2, a wavefront 202 is incident on a lenslet array comprising a plurality of lenslets 204A, 204B, 204C, and 204D. While only four lenslets are shown in FIG. 2 for illustration purposes, one of ordinary skill will recognize that many more lenslets are typically provided in a two-dimensional array. Wavefront 202 passes through the lenslet array and light entering each lenslet 204A, 204B, 204C, and 204D is focused on the image sensor 206. However, since the wavefront 202 is distorted, light entering each lenslet is not focused to a point on the image sensor 206 corresponding to the optical axis of the lenslet. Instead, the resulting spot is displaced by a certain amount in the x and y direction. For illustration purposes only, only one-dimensional displacements 208A, 208B, 208C, and 208D are shown in FIG. 2. The x and y displacements of each spot's centroid from its optical axis is proportional to the average x- and y-slopes of the wavefront 202 across the corresponding lenslet subaperture. Using only this "slope information" it is possible reconstruct the wavefront using conventional algorithms, the most common of which uses a least-squares approach.

However, there are several known problems in this area. First, the conventional slope-information only approach ignores potentially useful intensity information. Second, the slope averages measured by the SH-WFS are weighted by the intensity of the beam propagating through the lenslet. This can result in an incorrect wavefront reconstruction and suboptimal adaptive optics correction in the presence of intensity variation due to atmospheric turbulence scintillation and non-isotropic backscattering or other causes. Second, in cases of "deep" turbulence, reconstruction is hindered by branch cuts. A branch cut is a singularity in the wavefront which cannot be properly reconstructed by least-squares algorithms. While this problem can be somewhat mitigated by obtaining high resolution of the wavefront or additional hardware, the algorithms used in both approaches are computationally intensive. Thus, there is a need for a high-speed reconstruction algorithm that is tolerant of both scintillation and branch cuts and can operate on a wider variety of beam geometries.

Recently, deep learning has shown promise as a technique to solve many computational problems at high speed and accuracy. Deep convolutional networks have been shown to be capable of learning the effects of physical optical processes without specifying the underlying physics. The networks use as their fundamental template the U-net encoder-decoder architecture. A conventional U-net works by encoding salient features of an image at every length scale, then decoding those features into a desired output such as an uncorrupted image or a semantically segmented image. An extension of U-net has been demonstrated for SH-WFS reconstruction. Specifically, a modified U-net architecture in which the x- and y-slopes from the SH-WFS were encoded on separate paths and decoded into a wavefront on a single path. However, by relying solely on slope information, this approach cannot account for the effects of turbulence, and the network does not achieve correction above the $\lambda/14$ root mean square error (RMSE) Marechal criterion. Accordingly, it would be desirable to have a deep learning architecture that could account for the effect of turbulence in wavefront reconstruction.

SUMMARY OF THE INVENTION

One or more the above limitations may be diminished by structures and methods described herein.

In one embodiment, a system for correcting distorted wavefronts is provided. The system includes a wavefront sensor and a controller. The wavefront sensor receives a distorted wavefront and generates intensity data, x-slope data, and y-slope data corresponding to the distorted wavefront. The controller receives the intensity data, x-slope data, and y-slope data from the wavefront sensor and generates a reconstructed wavefront using a trained neural network based on the intensity data, x-slope data, and y-slope data.

In another embodiment, a method of correcting distorted wavefronts is provided. At a wavefront sensor, a distorted wavefront is received and intensity data, x-slope data, and y-slope data corresponding to the distorted wavefront is generated. At a controller, a reconstructed wavefront is generated using a trained neural network based on the intensity data, x-slope data, and y-slope data.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1B:
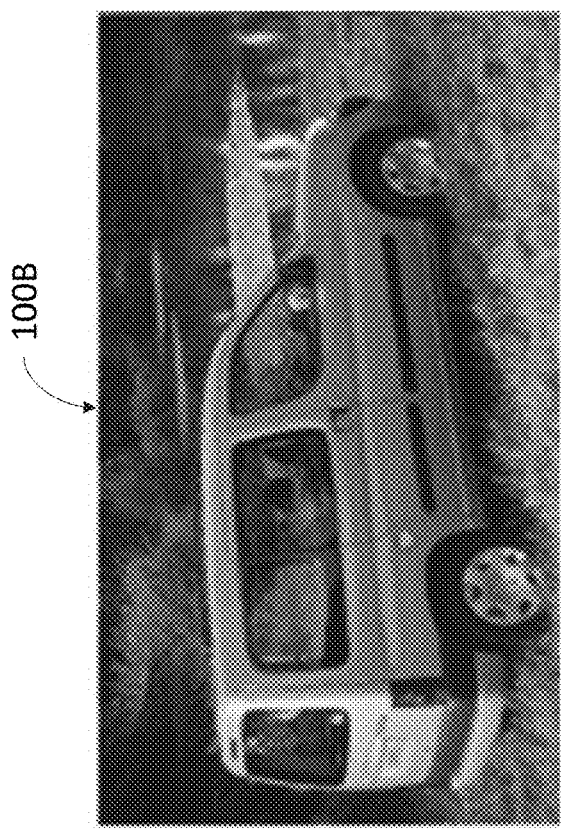
FIG. 1B is an image of the same subject as FIG. 1A under ideal optical conditions.
Figure 1A:
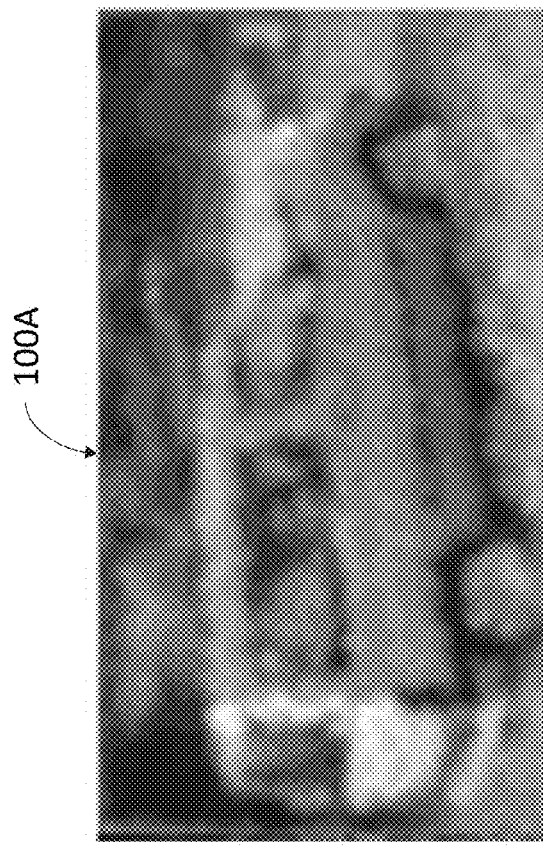
FIG. 1A is an image that has been distorted by air turbulence.
Figure 2:
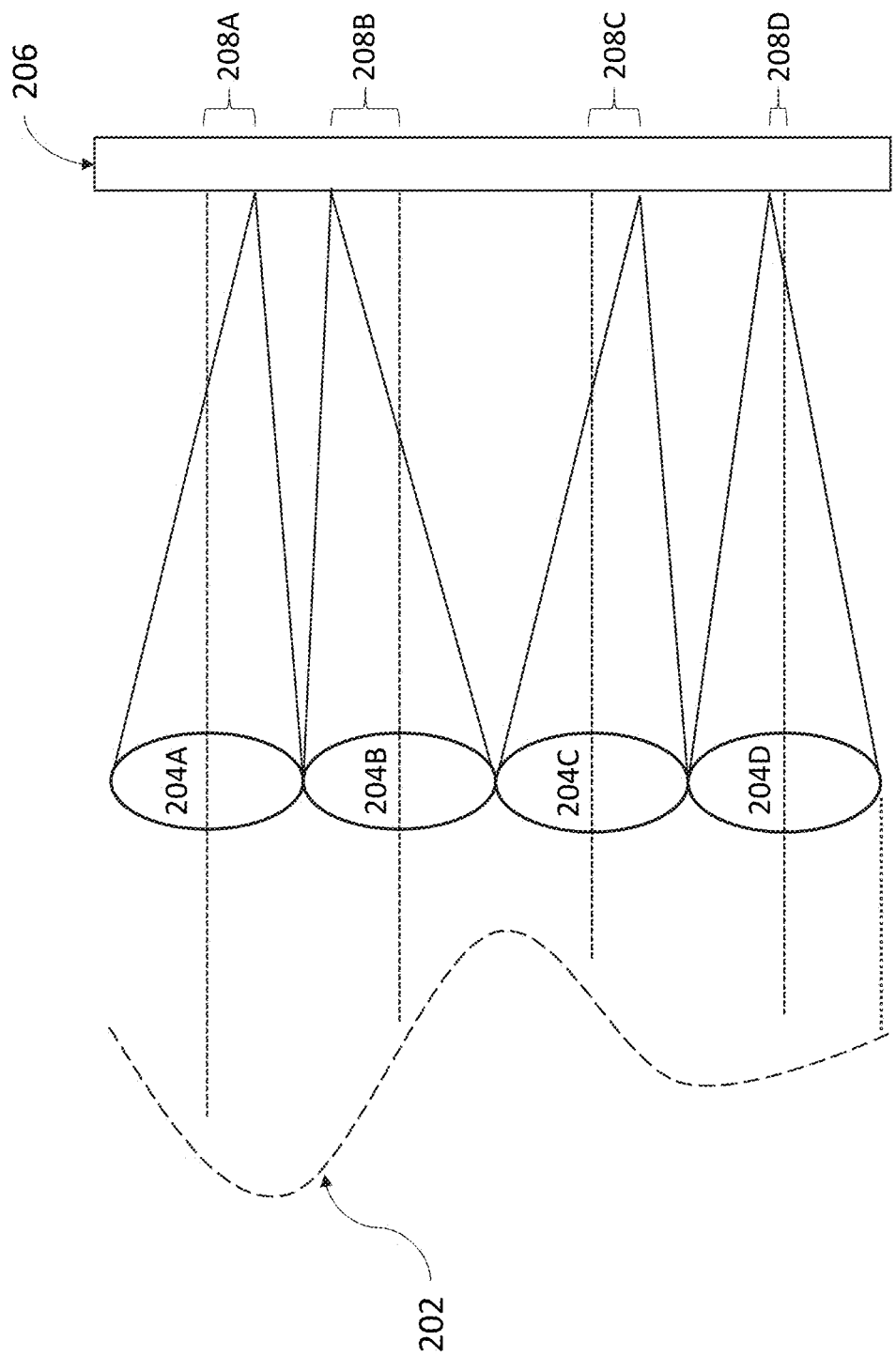
FIG. 2 is a schematic illustration of a SH-WFS.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

Figure 3A:
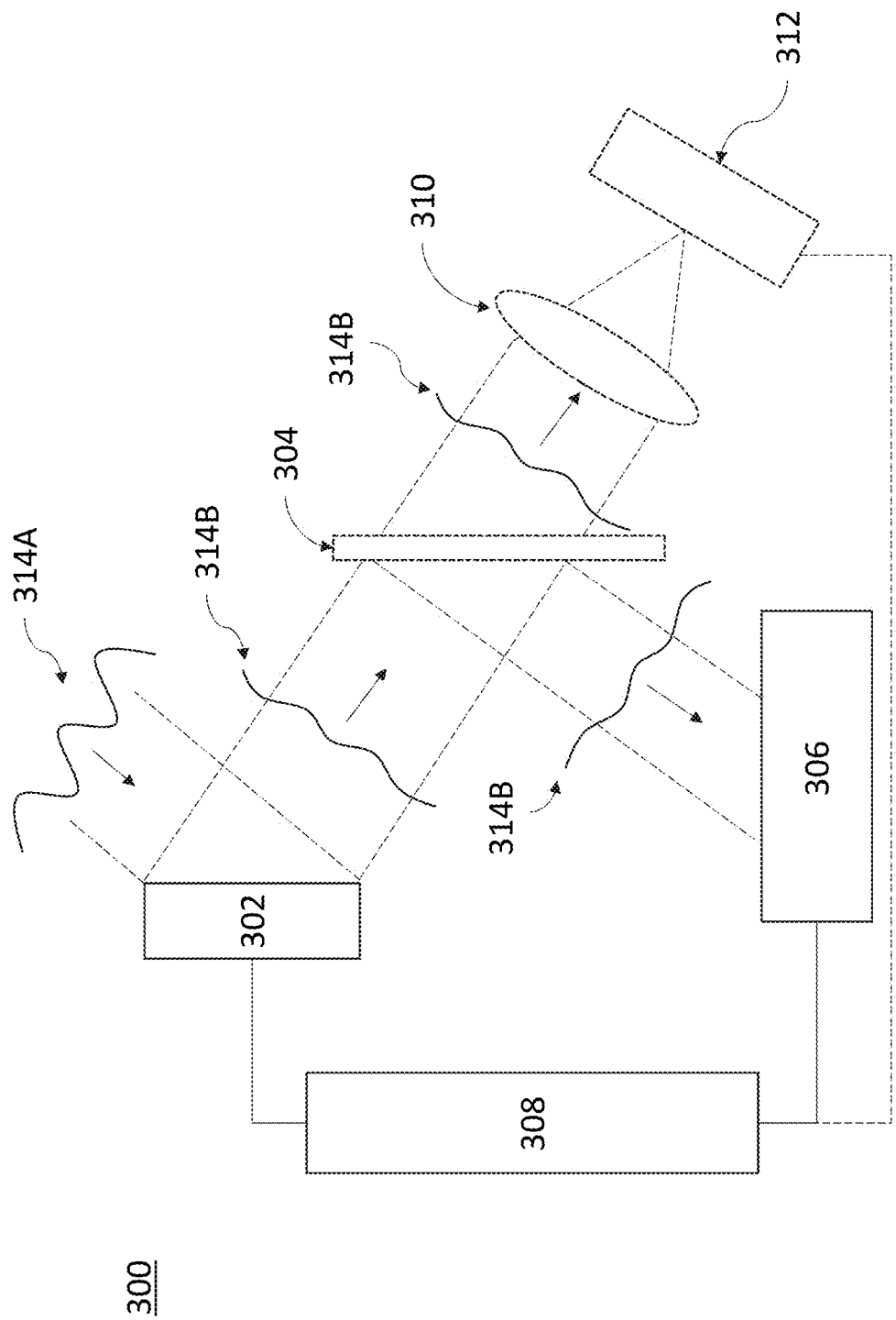
FIG. 3A is a schematic illustration of a system 300 for wavefront reconstruction according to one embodiment.

In accordance with example aspects described herein are apparatuses, methods, and systems for wavefront construction. FIG. 3A is a schematic illustration of a system 300 for wavefront reconstruction. As explained in greater detail below, the system 300 utilizes both slope information and image intensities at the subapertures of the lenslets in a SH-WFS to reconstruct the distorted wavefront. Since both intensity and slope information is used, the resulting network embodied by controller 308 is referred to as the Intensity/Slopes Network (ISNet or "network"). The apparatuses, systems, and methods described herein improve upon previous efforts. First, the system 300 uses densely connected convolutional layers (DenseNets) rather than conventional repeated convolutional layers to improve the generalization capability of system 300. Second, as explained below, system 300 uses another encoder arm that utilizes intensity information at each of the subapertures.

Figure 3B:
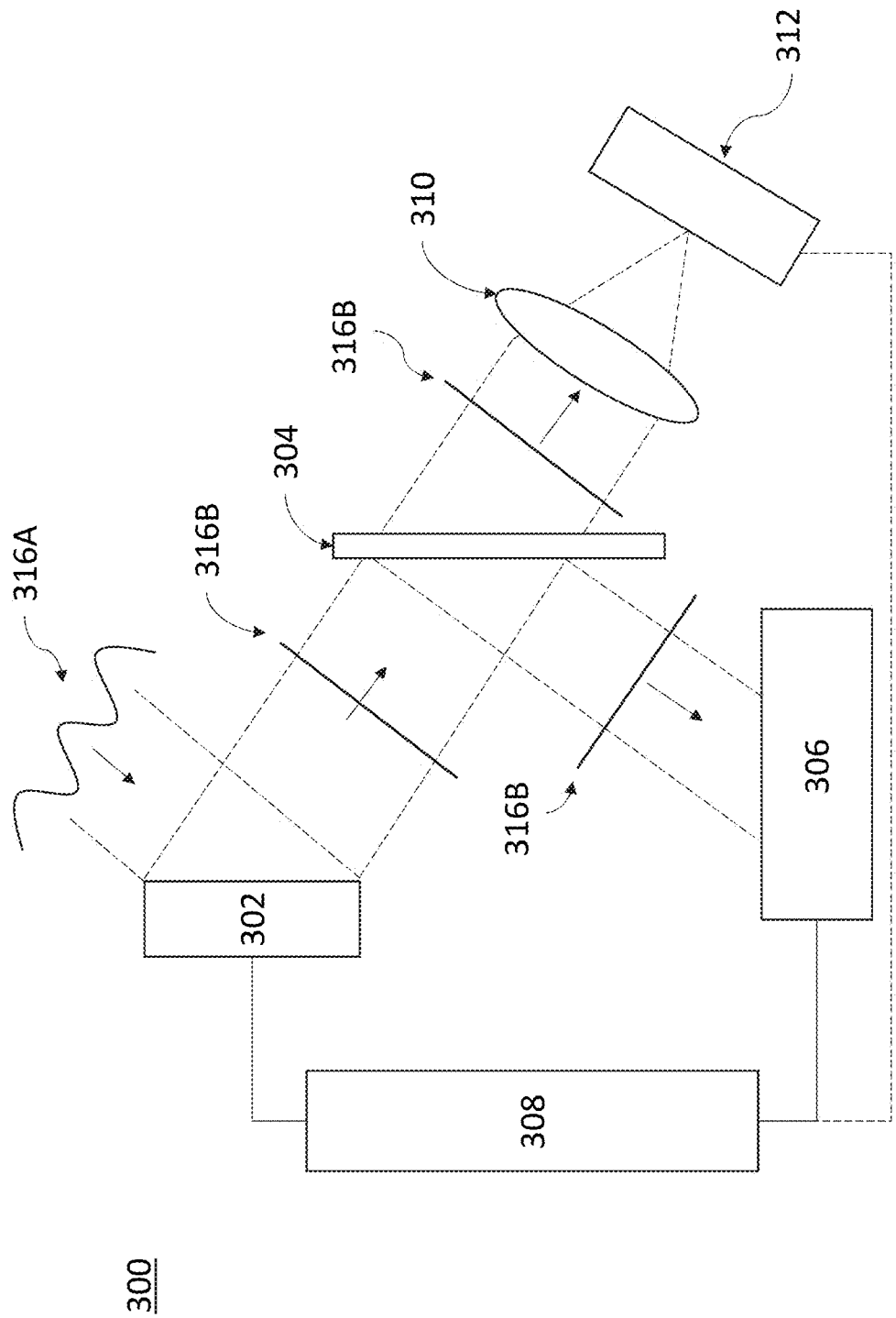
FIG. 3B is another schematic illustration of a system 300 for wavefront reconstruction according to one embodiment.
Figure 4A:
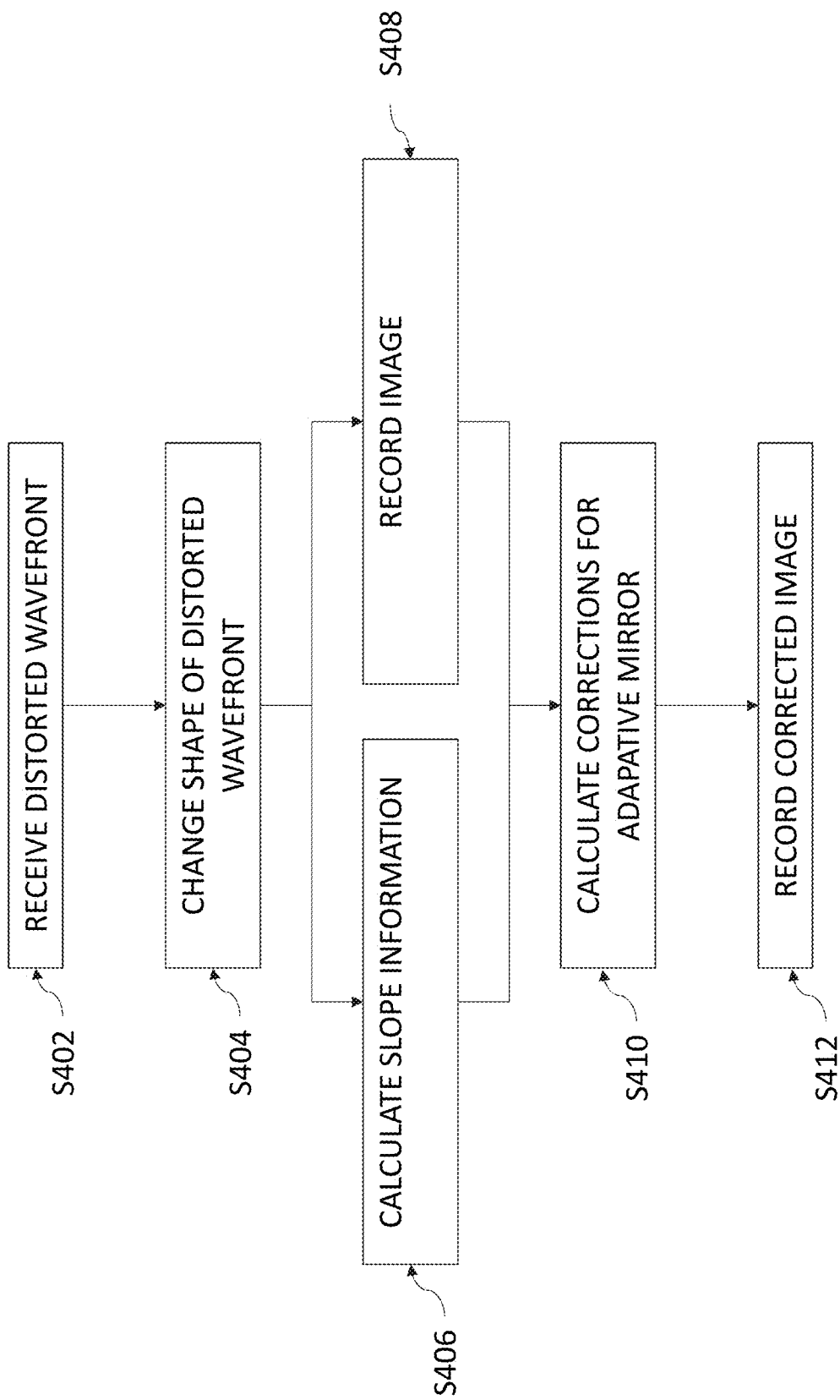
FIG. 4A is a flowchart depicting a method of recording a corrected image according to one embodiment.

As shown in FIGS. 3A-B and 4, a distorted wavefront 314A is incident on an adaptive mirror 302 (S402). As one of ordinary skill will recognize, the adaptive mirror 302 comprises a plurality of reflecting elements whose orientation with respect to the incident wavefront 314A can be changed under the control of a controller 308. An initial set of orientations for the reflecting elements is set by controller 308 and may provide some or no correction to the incident wavefront 314A (S404) since the amount of distortion is initially unknown. The incident wavefront 314A reflects off the adaptive mirror 302 to form a reflected wavefront 314B. In one embodiment, the reflected wavefront 314B is split by a beamsplitter 304. One copy of the reflected wavefront 314B passes to a lens 310 which directs the reflected wavefront 314B on an image sensor 312 where an image is recorded (S408). The image sensor 312 may be a CCD or CMOS imaging sensor. The other copy of wavefront 314B passes to a wavefront sensor 306 which, in a preferred embodiment, is a SH-WFS. The wavefront sensor 306 calculates the x- and y-slope information (S406) and the intensity information of the reflected wavefront 314B and provides the same to controller 308. Described below is an exemplary technique for using both x- and y-slope information and intensity information from the wavefront sensor 306 to reconstruct the wavefront 314A; however, as one of ordinary skill will appreciate, in another embodiment the intensity information may correspond to image data generated by image sensor 312 and provided to controller 308, as indicated by the dashed line in FIGS. 3A and 3B. A typical SH-WFS includes a CCD or CMOS imaging sensor and as such the controller 308 may be equally capable of processing image data from SH-WFS 306 or image sensor 312. For brevity, the description below assumes that the intensity information corresponds to image data recorded by wavefront sensor 306; but one of ordinary skill in the art will appreciate that such information could also correspond to image data recorded by image sensor 312. In another embodiment, the beamsplitter 304, lens 310, and image sensor 312 may be omitted (as indicated by the dotted lines in FIG. 3A) in a case where reconstruction of the wavefront 314A is the primary focus of system 300.

Controller 308 comprises a processor and memory storing programs instructions that, when executed by the processor, enables the controller to perform control of the system 300 as described herein. The memory may also include storage space for data used in the processes described herein as well as the results. The processor may be a CPU, ASIC, microcontroller, or microcomputer. Controller 308 may also include a graphical processing unit such as, for example, an NVIDIA V100 GPU. Controller 308 processes the x- and y-slope information and intensity data from the wavefront sensor 306 and calculates a reconstructed wavefront, as described below.

In one embodiment, controller 308 may also determine the adjustments for the plurality of reflecting elements in adaptive mirror 302 to account for the atmospheric turbulence and control the adaptive mirror to effectuate such adjustments (S410). The process may then repeat for so long as images are desired, and the recorded images may be provided by controller 308 to an external device via I/O hardware (not shown). This is illustrated in FIG. 3B where the reflected wavefront 316B is less distorted due to the corrections applied to the reflecting element in the adaptive mirror 302 based on the control from controller 308. Having described the structure of system 300 and the functions of the various components thereof, attention will now be directed to the steps by which controller 308 produces a reconstructed wavefront.

Figure 4B:
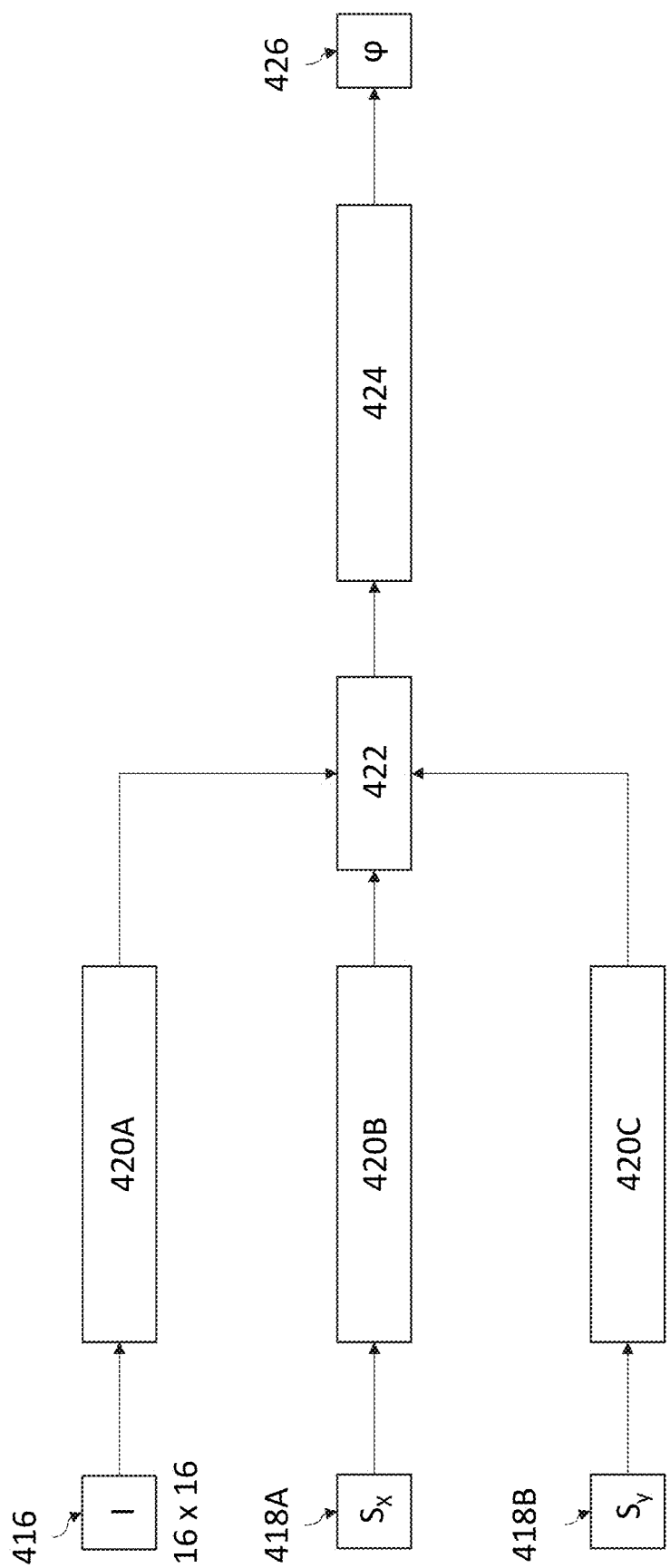
FIG. 4B is a schematic illustration of a network for reconstructing a wavefront implemented by a controller according to one embodiment.

As discussed above, controller 308 operates on the output of wavefront sensor 306, which in the preferred embodiment is a 16×16 SH-WFS. The x-slope information, the y-slope information, and the intensity information from the wavefront sensor 306 are provided to controller 308. As shown in FIG. 4B, the recorded intensity data from the SH-WFS 416, the x-slope information 418A, and the y-slope information 418B are fed into respective encoder arms 420A, 420B, and 420C. The features of encoder arms 420A, 420B, and 420C are discussed in detail below. Each of encoder arms 420A, 420B, and 420C reduces in size their respective data through successive dense blocks and downsampling blocks until the data reaches a lateral size of 1×1. The data from the encoder arms 420A, 420B, and 420C is then concatenated into data 422 which sent into a decoder arm 424. The data in the decoder arm 424 is decoded by a series of upsampling and dense blocks until it reaches a lateral size of 32×32 before being sent through a final 1×1 convolutional layer to produce an unwrapped wavefront estimate. As one of ordinary skill will appreciate, an unwrapped wavefront means the wavefront is continuous and for wavefronts greater than a the full wavefront range is displayed. Using this wavefront estimate, the adaptive mirror 302 may be reconfigured to better correct the incident wavefront 316A. Having described the overall process for handling the intensity data and slope data, attention will now be directed to the details of the encoder arms 420A, 420B, and 420C and the decoder arm 424.

Figure 5A:
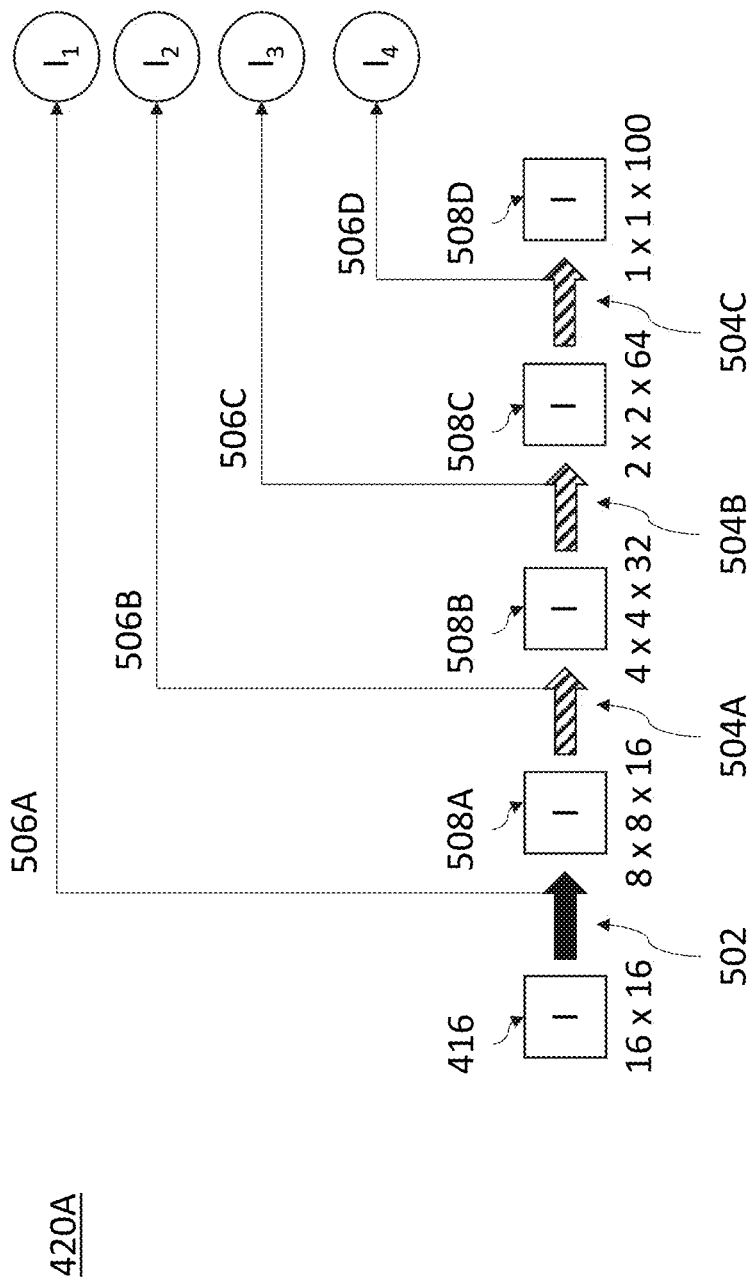
FIG. 5A is a schematic illustration of an encoder arm for intensity data according to one embodiment.

FIG. 5A is a schematic illustration of encoder arm 420A. Encoder arm 420A receives the intensity information 416 recorded by the wavefront sensor 306. The intensity information, or data, 416 is supplied to a machine learning algorithm as an input where it is subject to 502 where it is passed through a 3×3×16 convolutional layer, then a leaky ReLU and a 2×2 average pooling layer. As one of ordinary skill will appreciate, a convolutional layer applies the convolution operation and passes the result to the next layer. As one of ordinary skill will also appreciate, a leaky ReLU (Rectified Linear Unit) is a type of activation function that has a small gradient for negative values instead of a flat gradient. The slope coefficient may be predetermined by a user based on the applied situation. Finally, and once again as one of ordinary skill will appreciate, the 2×2 average pooling layer calculates the average for each patch of the layer. The output of operation 502 is an 8×8×16 data block 508. A portion of the data generated during operation 502 is also used as an input for a later operation in the decoder arm 424, as indicated by arrow 506A, these connections between the encoder arms 420A, 420B, and 420C and the decoder arm 424 are referred to as "skip connections".

The 8×8×16 intensity data 508A resulting from operation 502 is then subject to operation 504A. In operation 504A, the data is passed through a dense block 800 and a downsampling block 900. The features of the dense block 800 are illustrated in FIG. 8 and the features of the downsampling block 900 are illustrated in FIG. 9.

Figure 8:
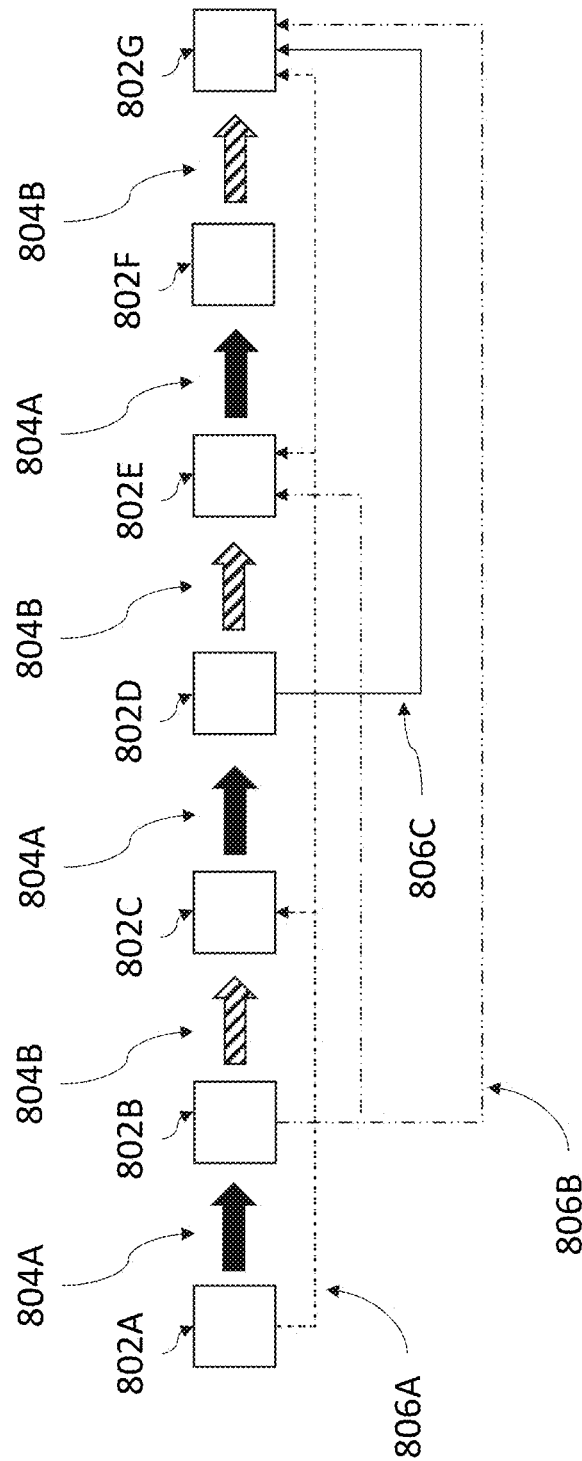
FIG. 8 is an illustration of a dense block according to one embodiment.

FIG. 8 is a schematic illustration of the dense block 800. The process begins by receiving some input data. In the case of FIG. 5A, the input data is 8×8×16 intensity data 508A. However, as explained below, other data may be passed through the dense block 800. Thus, for purposes illustrating the features of the dense block 800, a generic input data 802A will be used as a placeholder for other data. Within the dense block 800 two operations are repeatedly perform. Operation 804A involves passing the initial data through a batch normalization (BatchNorm) which adjusts the mean and variances of each layer's inputs, a leaky ReLU, and a 3×3×12 convolutional layer. Operation 804B is a concatenation operation that concatenates two or more sets of data. The flow of input data 802A through the dense block 800 will now be explained in reference to FIG. 8.

The input data 802A is subject to operation 804A resulting in data 802B which then concatenated (operation 804B) with the input data 802A, as indicated by skip connection 806A, to generate data 802C. Then, data 802C is subjected to operation 804A to generate data 802D. Data 802D is then concatenated with data 802A and 802B (operation 804B) as indicated by skip connections 806A and 806B, resulting in data 802E. Data 802E is then subject to operation 804A to generate data 802F. Data 802F is then concatenated (operation 804B) with data 802A, 802B, and 802D to generate data 802G. The resulting data 802G is then passed to a downsampling block 900 which is illustrated in FIG. 9.

Figure 9:
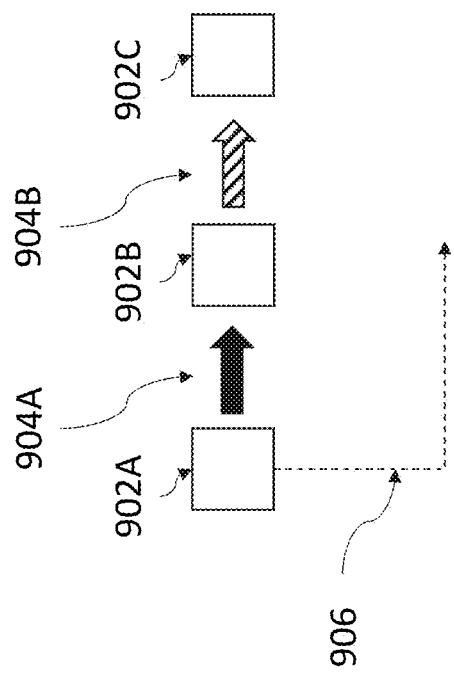
FIG. 9 is an illustration of a downsampling block according to one embodiment.

FIG. 9 is a schematic illustration of the downsampling block 900. Like the above discussion of FIG. 8, the illustration of the downsampling block 900 is genericized to be independent of the input data. Thus, for the purpose of illustrating the features of the downsampling block 900, generic input data 902A is described. Before describing the details of the downsampling block 900, it is noted that the input data 902A may also be provided to a portion of the decoder arm 424 through skip connection 906 for use in the decoder arm 424, as explained below. For example, data 802G output from the dense block 800 may be input data 902A and also provider to the decoder arm 424. The input data 902A is subject to operation 904A where it is passed through a BatchNorm, a leaky ReLU, and a 1×1×N (where N is the number of parameters at that layer) convolutional layer resulting in data 902B. Data 902B is then passed through a 2×2 average pooling layer resulting in data 902C. Having described the details of the dense block 800 and the downsampling block 900, attention will now be directed back to FIG. 5A.

As described above, 8×8×16 intensity data 508A is reduced in size (operation 504A) by passing through the dense block 800 and downsampling block 900 resulting in 4×4×32 intensity data 508B. The 4×4×32 intensity data 508B is further reduced in size (operation 504B) by passing through dense block 800 and downsampling block 900 resulting in 2×2×64 intensity data 508C. The 2×2×64 intensity data is further reduced in size (operation 504C) by passing through dense block 800 and downsampling block 900 resulting in 1×1×100 intensity data. As noted above, input data 902A may also be provided to a portion of the decoder arm 424. This is shown in FIG. 5A by skip connections 506A-D, with identifiers $I_1$, $I_2$, $I_3$ and $I_4$ merely denoting connections across different Figures. Having described the features of encoder 420A, attention will now be directed to the features of encoder arm 420B in reference to FIG. 5B.

Figure 5B:
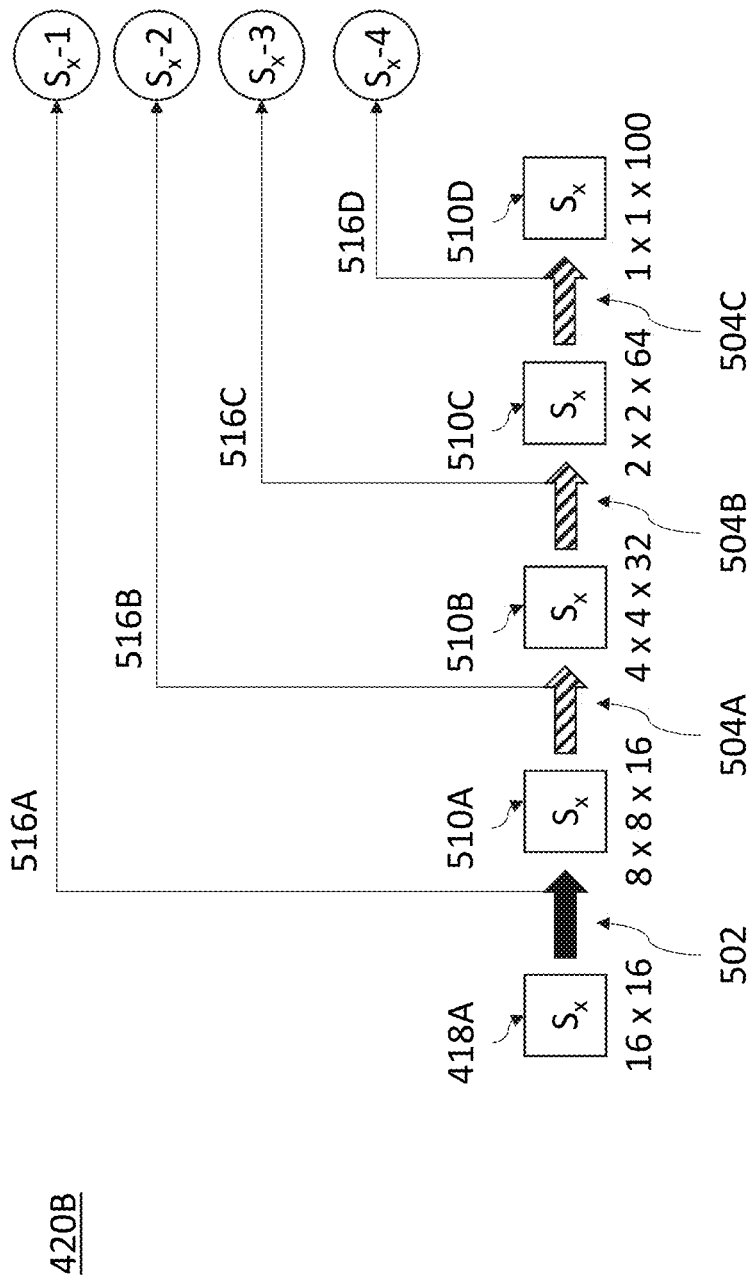
FIG. 5B is a schematic illustration of another encoder arm for x-slope information according to one embodiment.

FIG. 5B is a schematic illustration of encoder 420B. Encoder arm 420B is substantially the same as encoder arm 420A, and thus for brevity a detailed description of its components is omitted. In contrast to encoder arm 420A, the data input into encoder arm 420B is 16×16 x-slope information 418A from the wavefront sensor 306. The 16×16 x-slope information 418A is subjected to operation 502 where it is passed through a 3×3×16 convolutional layer, a leaky ReLU, and a 2×2 average pooling layer resulting in 8×8×16 x-slope data 510A. The 8×8×16 x-slope data 510A is then reduced in size (operation 504A) by passing it through the dense block 800 and downsampling block 900 resulting in 4×4×32 x-slope data 510B. The 4×4×32 x-slope data 510B is further reduced in size (operation 504B) by passing through dense block 800 and downsampling block 900 resulting in 2×2×64 x-slope data 510C. The 2×2×64 x-slope data 510C is further reduced in size (operation 504C) by passing through dense block 800 and downsampling block 900 resulting in 1×1×100 x-slope data 510D. FIG. 5B also shows a plurality of skip connections 516A-D with identifiers $S_x\text{-}1$, $S_x\text{-}2$, $S_x\text{-}3$, and $S_x\text{-}4$ denoting connections across different Figures. Having described the features of encoder 420B, attention will now be directed to the features of encoder arm 420C in reference to FIG. 5C.

Figure 5C:
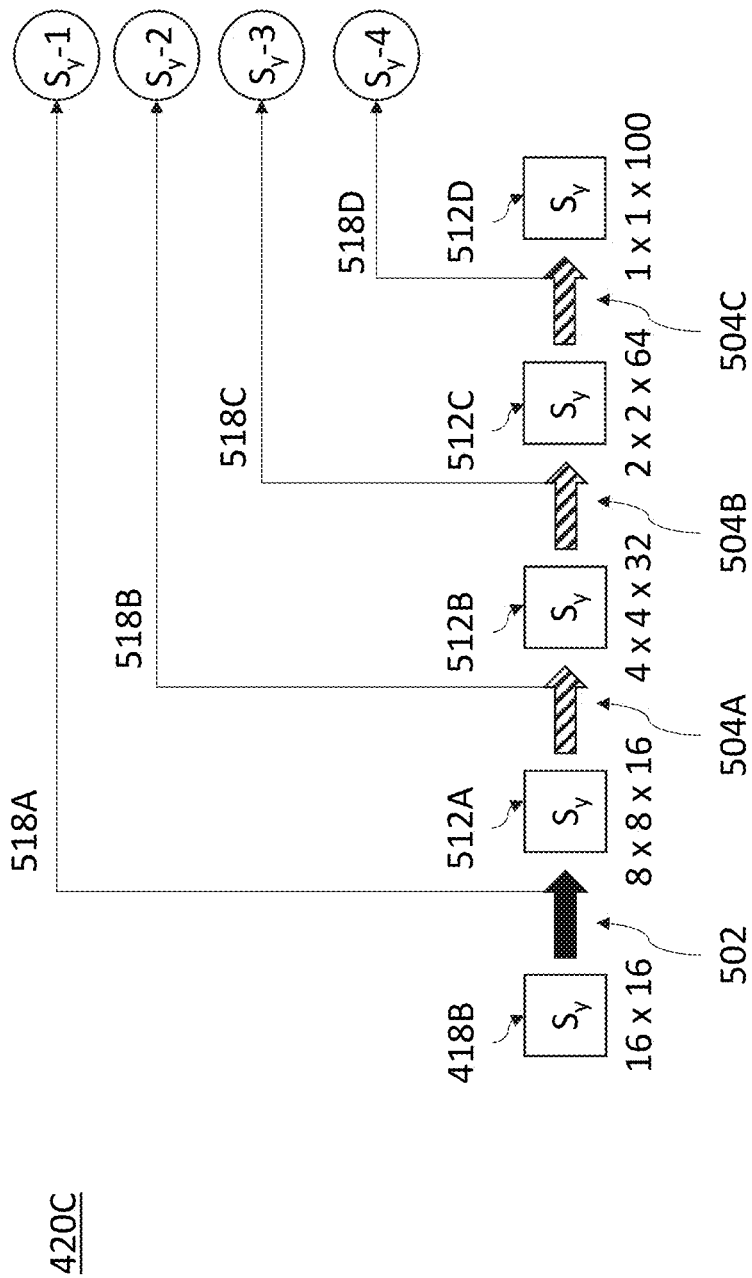
FIG. 5C is a schematic illustration of another encoder arm for y-slope information according to one embodiment.

FIG. 5C is a schematic illustration of encoder 420C. Encoder arm 420C is substantially the same as encoder arms 420A and 420B, and thus for brevity a detailed description of the components is omitted. In contrast to encoder arm 420B, the data input into encoder arm 420B is 16×16 y-slope information 418B from the wavefront sensor 306. The 16×16 y-slope information 418B is subjected to operation 502 where it is passed through a 3×3×16 convolutional layer, a leaky ReLU, and a 2×2 average pooling layer resulting in 8×8×16 y-slope data 512A. The 8×8×16 y-slope data 512A is then reduced in size (operation 504A) by passing it through the dense block 800 and downsampling block 900 resulting in 4×4×32 y-slope data 512B. The 4×4×32 y-slope data 512B is further reduced in size (operation 504B) by passing through dense block 800 and downsampling block 900 resulting in 2×2×64 y-slope data 512C. The 2×2×64 y-slope data 512C is further reduced in size (operation 504C) by passing through dense block 800 and downsampling block 900 resulting in 1×1×100 y-slope data 512D. FIG. 5C also shows a plurality of skip connections 518A-D with identifiers $S_y$-1, $S_y$-2, $S_y$-3, and $S_y$-4 denoting connections across different Figures. Having described the features of encoder arms 420A, 420B, and 420C, attention will now be directed to the concatenation operation 422 and the decoder arm 424.

Figure 6:
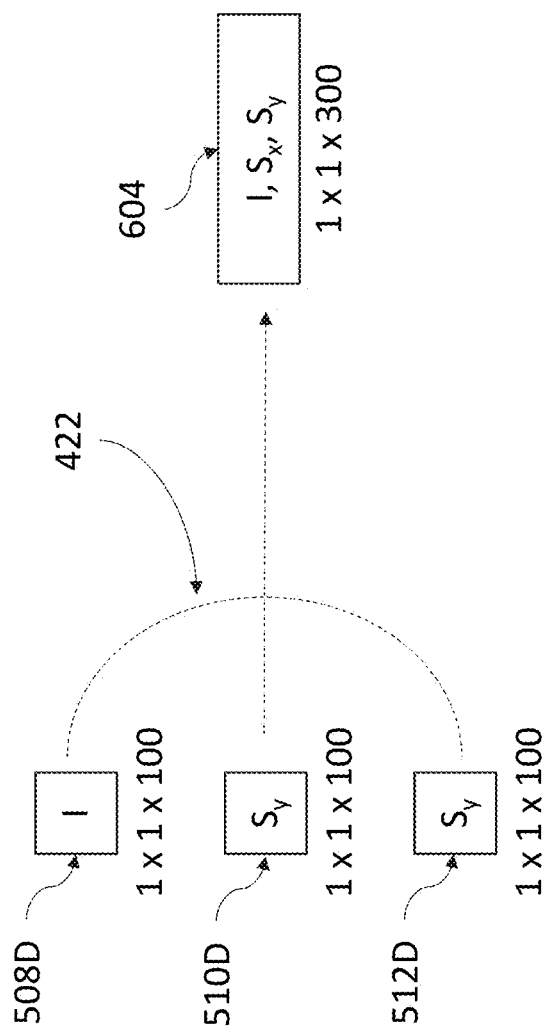
FIG. 6 is an illustration of a concatenation operation on the outputs of the encoder arms in FIGS. 5A-C.

As shown in FIG. 6, the outputs of encoder arms 420A, 420B, and 420C are 1×1×100 image data 508, 1×1×100 x-slope data 510D, and 1×1×100 y-slope data 512D. These data sets are concatenated and sent through a dense layer. The result is 1×1×300 concatenated data 604. The concatenated data 604 is then provided to the decoder arm 424, shown in FIG. 7.

Figure 7:
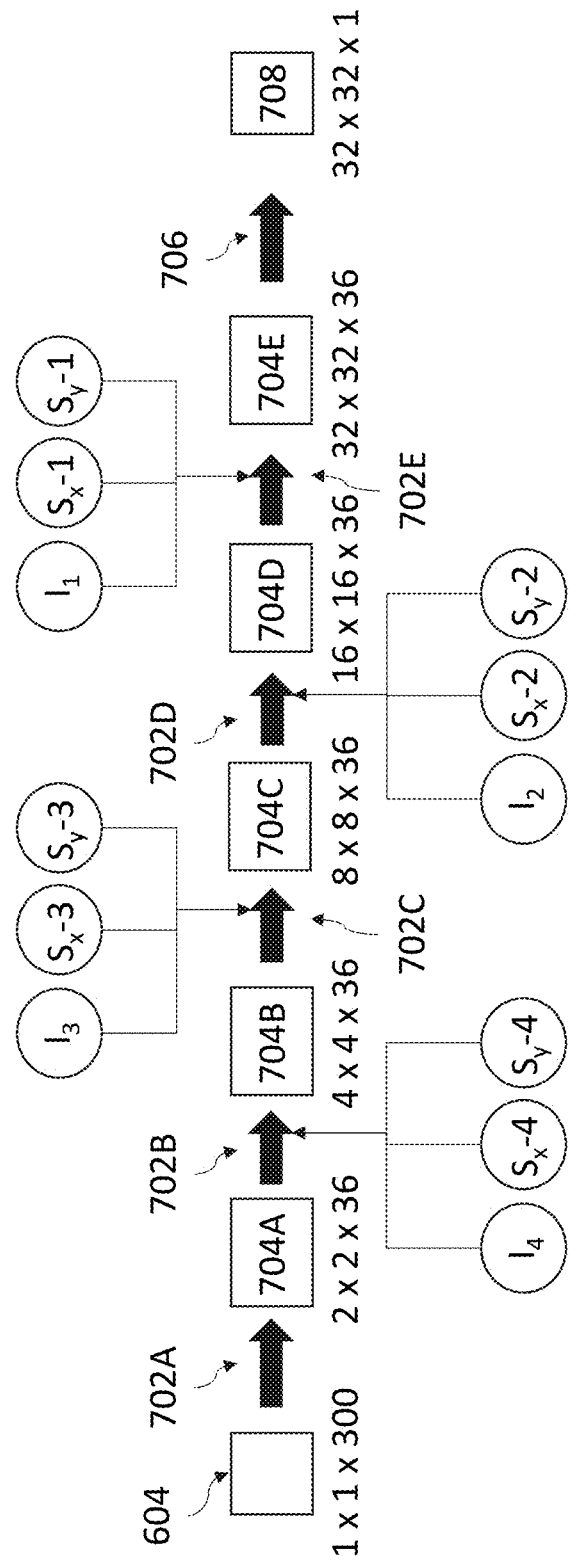
FIG. 7 is an illustration of a decoder arm according to one embodiment.

FIG. 7 is a schematic illustration of the decoder arm 424. In general, the concatenated data 604 is decoded by a series of upsampling and dense blocks until it reaches a lateral size of 32×32, where it is sent through a final 1×1 convolutional layer to produce an unwrapped wavefront estimate. Concatenated data 604 is first subjected to operation 702A. In operation 702A, the concatenated data 604 is passed through dense block 800, described above, and then an upsampling block 1000 illustrated in FIG. 10.

Figure 10:
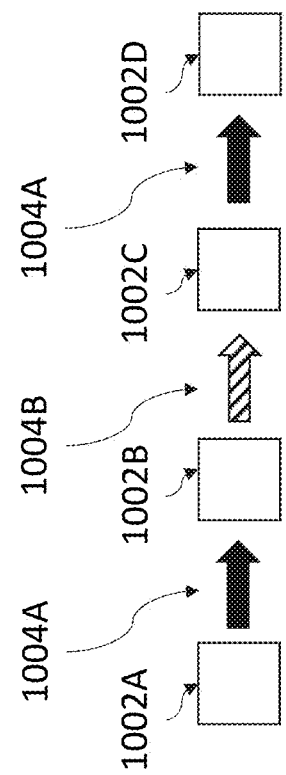
FIG. 10 is an illustration of an upsampling block according to one embodiment.

FIG. 10 is a schematic illustration of an upsampling block 1000. Like above with blocks 800 and 900, block 1000 will be described with reference to generic input data, as the upsampling block is used repeatedly in decoder arm 424 on different input data. Input data 1002A is subjected to operation 1004A where the input data 1002A is passed through a 3×3×36 convolutional layer and a leaky ReLU to generate output data 1002B. Output data 1002B is then passed through a 2×2 upscaling layer (operation 1004B) to generated data 1002C. Data 1002C is then subjected to operation 1004A to generate output data 1002D.

Returning to FIG. 7, the 1×1×300 concatenated data is subjected to operation 702A whereby it is passed through dense block 800 and upsampling block 1000. The resulting 2×2×36 data 704A is then subjected to operation 702B where it is concatenated with data supplied by skip connections 506D, 516D, and 518D from the encoder arm, as indicated by $I_4$, $S_x$-4, and $S_y$-4 in FIG. 7, and the resulting concatenated data is then passed through dense block 800 and upsampling block 1000 to generate 4×4×36 data 704B. The 4×4×36 data 704B is then subjected to operation 702C where it is concatenated with data supplied by skip connections 506C, 516C, and 518C from the encoder arms, as indicated by $I_3$, $S_x$-3, and $S_y$-3 in FIG. 7, and the resulting concatenated data is passed through dense block 800 and upsampling block 1000 to generate 8×8×36 data 704C. The 8×8×36 data 704C is then subjected to operation 702D where it is concatenated with data supplied by skip connections 506B, 516B, and 518B from the encoder arms, as indicated by $I_2$, $S_x$-2, and $S_y$-2 in FIG. 7, and the resulting concatenated data is passed through dense block 800 and upsampling block 1000 to generate 16×16×36 data 704D. The 16×16×36 data 704D is then subjected to operation 702E where it is concatenated with data supplied by skip connections 506A, 516A, and 518A from the encoder arms, as indicated by $I_1$, $S_x$-1, and $S_y$-1 in FIG. 7, and the resulting concatenated data is passed through dense block 800 and upsampling block 1000 to generate 32×32×36 data 704E. Finally, the 32×32×36 data 704E is passed through a 1×1 convolutional layer (operation 706) to generate an unwrapped wavefront estimate 708. Having described the details of how controller 308 processes data received from the wavefront sensor 306, attention will now be directed to training and validating the network.

As one of ordinary skill in the art will appreciate, it is possible to create a simulation to train the network described above and implement by controller 308. Described below is an exemplary simulation for training, validating, and testing the network. Of course, as one of ordinary skill will recognize, other simulations or test data could be used to train the network.

Figure 11:
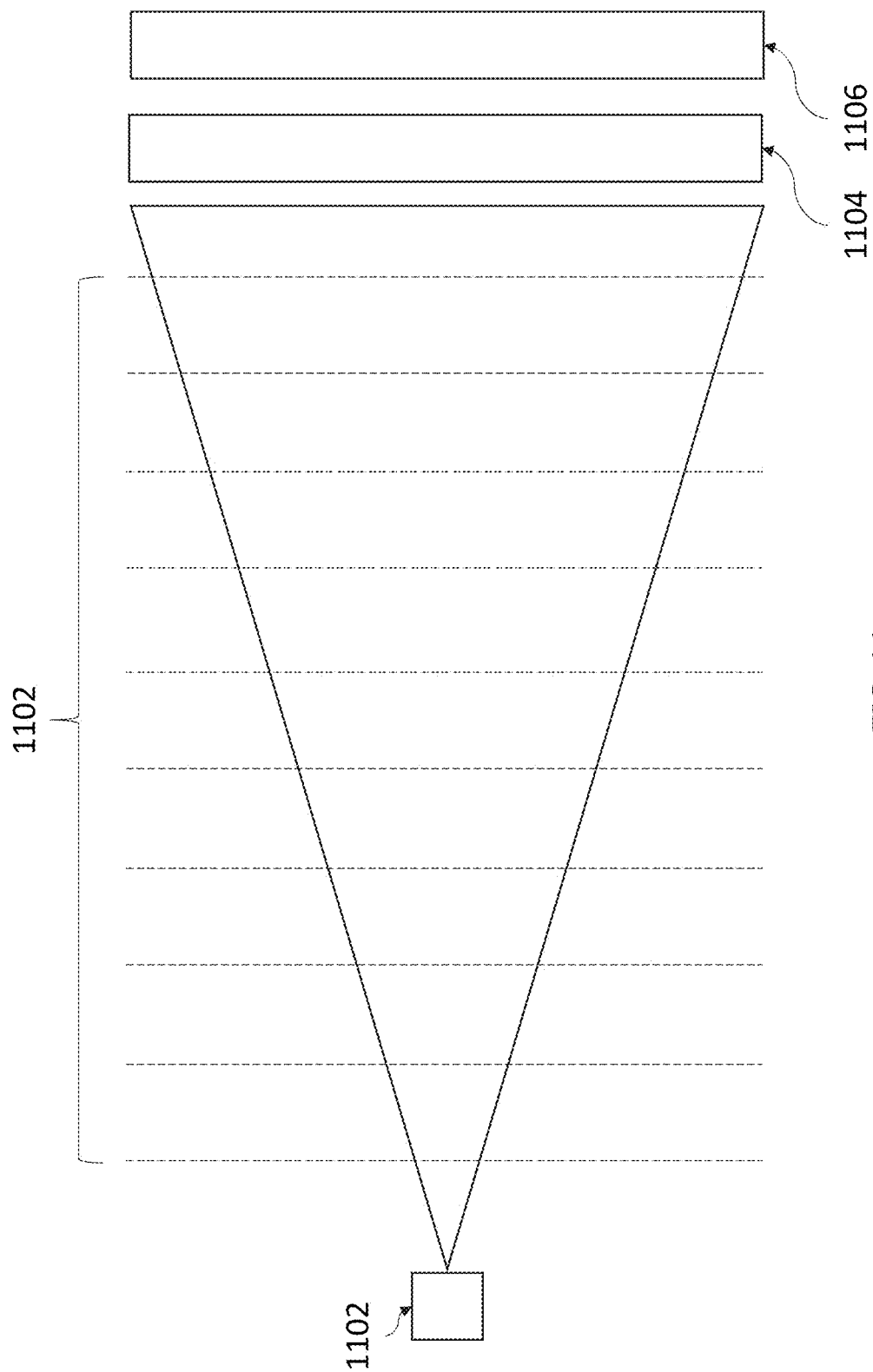
FIG. 11 is an illustration of a simulated environment for training the network embodied in controller 308.

FIG. 11 illustrates the geometry of a training simulation. The training simulation numerically propagates a beam of light through turbulence. To simulate a variety of real-world turbulence levels, the simulation considers propagation of light from a point source 1102 over two-kilometers to a 30 cm diameter 16×16 lenslet array 1104 and corresponding sensor 1106. Ten evenly spaced turbulence screens 1102 are placed along the path. The $C_n^2$ values ranged from $1.5 \times 10^{-14}$ to $5 \times 10^{-14}$, with corresponding Rytov numbers from 0.27 to 0.89 and Fried parameters ($r_0$) from 4.1 to 1.9 cm. For each $C_n^2$ value, 74 batches of data were created: 56 for training, 8 for validation, and 10 for testing. For each batch, 32 randomly generated unique Kolomgorov phase screens were generated by Fourier transform techniques, as described in R. Lane et al., *Waves in Random Media*, 2, 209 (1992) the contents of which are incorporated herein in their entirety. Next, 1,204 unique turbulence realizations were generated for each batch. The turbulence realizations were generated by selecting a random sequence of 10 phase screens without replacement from the batch's 32 phase screens. To ensure the reuse of screens did not cause overfitting, different batches were used for training, validation, and test samples. A beam was then propagated through the ten chosen phase screens. The beam, emanating from source 1102, began as a monochromatic Gaussian point source with a wavelength of 1550 nm with a $1/e^2$ radius of 0.6 cm. To avoid aliasing, a grid size of 850×850 with a pixel pitch of 0.16 cm was used. Light from source 1102 propagated by the angular spectrum method along 10 steps of 200 m each to lenslet array 1104 and sensor 1106. After each step, a turbulent phase screen was applied.

Lenslet array 1104 comprises a circular aperture 30 cm in diameter masking a 16×16 subaperture array of lenslets. The wavefront sensing process was performed by taking the Fourier transform of each subaperture and calculating the centroid of the resulting intensity. The centroids' displacements were then converted to slopes under the assumption of a 1 mm focal length lenslet. Only slopes of subapertures whose area was at least 90% within the circular aperture were used. Slopes were normalized by division so that the RMS value of all x- and y-slopes was 1. The intensity measurements were made by summing the intensity in each subaperture after the circular aperture and linearly normalized to occupy the range 0-1. The ground truth wavefront measurements were created by unwrapping the wavefront of the field after the circular aperture by the 2D Goldstein algorithm, as disclosed in R. M. Goldstein et al. *Radio Sci.* 23, 713 (1988) the contents of which are incorporated by reference herein in their entirety, and then downsampling to 32×32.

Training was performed in the Keras library, as disclosed in F. Chollet "Keras," https://github.com/fchollet/keras (2015), the contents of which are incorporated by reference herein in their entirety, with a Tensorflow backend, as disclosed in M. Abadi et al., 12$^{th}$ *USENIX Symposium on Operating Systems Design and Implementation (OSDI* 16), USENIX Association, 2016, pp. 265-283, the contents of which are incorporated by reference herein in their entirety. The training was set to minimize the standard deviation of the difference between the true and reconstructed wavefronts. This is equivalent to the root mean square error (RMSE) of the reconstruction when the piston terms of each wavefront are ignored, which is acceptable because piston has no effect on beam quality. The training regimen was 150 epochs of the Adam optimization algorithm split into three 50 epoch segments with learning rates of $1 \times 10^{-3}$, $3.16 \times 10^{-4}$, and $1 \times 10^{-4}$.

To properly evaluate the network, the network was also trained from R. Swanson et al., Proc. SPIE 10703, 107031F (2018), the contents of which are incorporated by reference herein in their entirety. For comparison, the wavefront reconstruction was also calculated based on the Southwell least squares reconstruction technique disclosed in W. H. Southwell, J. Opt. Soci. Am. 70, 998 (1980) the contents of which are incorporated by reference herein in their entirety. Southwell is a high-fidelity reconstructor in a low-turbulence environment.

Figure 12:
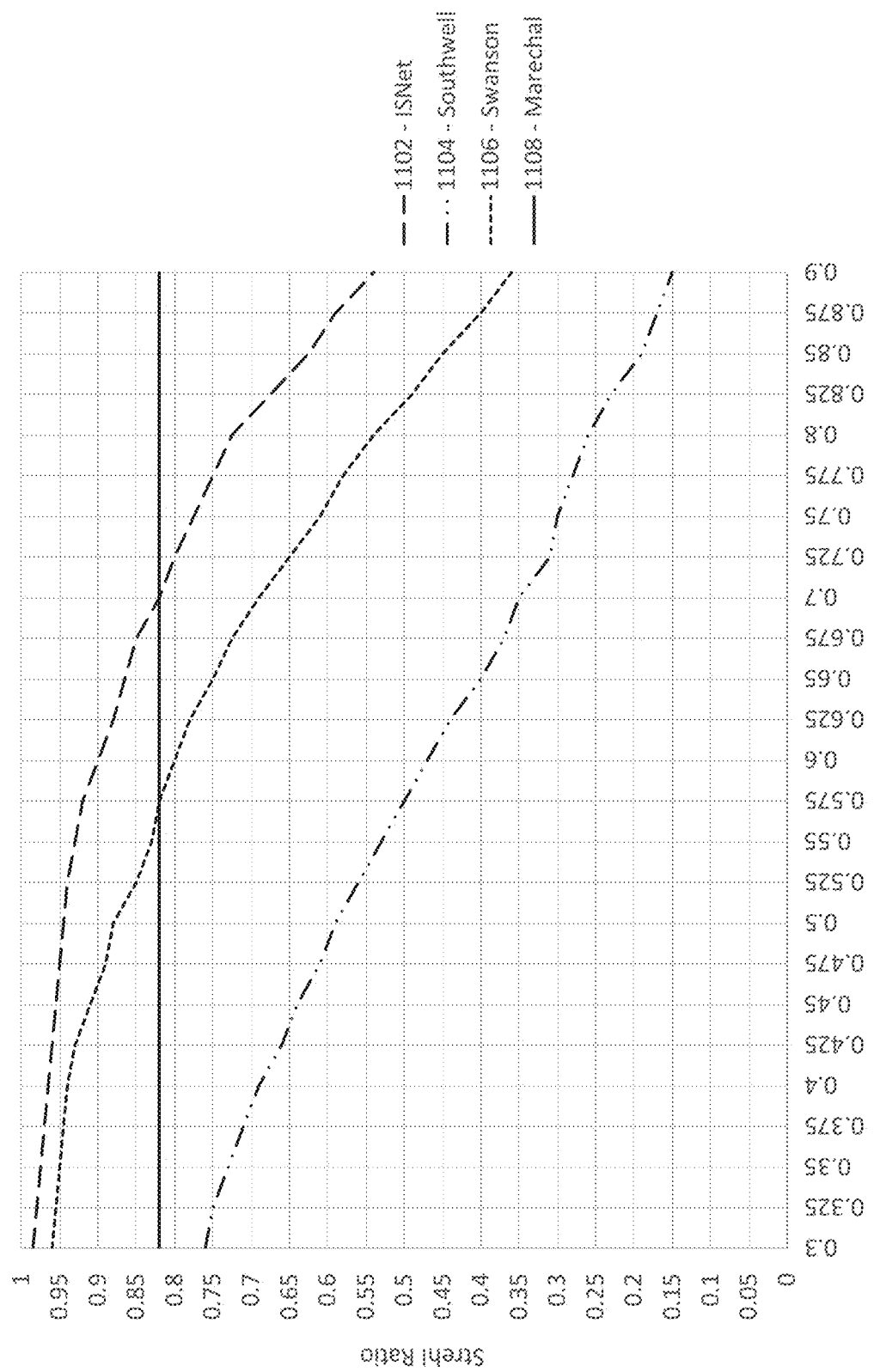
FIG. 12 is a plot of Strehl ratio to Rytov Number for the wavefront reconstructed by system 300 compared to a least squares approach.

FIG. 12 shows a comparison of the wavefront reconstruction produced by the network implement by controller 308 and described above (1102), the Southwell least squares reconstruction technique (1104), and the Swanson network (1106). Also shown in FIG. 12 is the Strehl ratio of a Marechal criterion-limited beam (1108). An approximate Strehl ratio is given by $S=\exp[-(2\pi\bar{\phi})]^2$, where $\bar{\phi}$ is the wavefront RMSE. For more accurate beam quality metric, the piston term from the ground truth and reconstruction wavefronts was removed. It is self-evident from FIG. 12, that the network implemented by controller 308 performed better than the Swanson network and the Southwell least squares reconstruction, with performance above the Marechal criterion (Strehl ratio of 0.82) up to approximately Rytov=0.7. In comparison, the Swanson network produce lower results at all points and was above the Marechal criterion up to only approximately Rytov=0.575. The Southwell least squares reconstruction failed to produce reconstructions above the Marechal criterion over the entire range due to the strength of the turbulence.

Not only does the network described above and implemented by controller 308 provided superior results compared to conventional networks, it does so using less computational resources. In terms of memory footprint, the ISNet network described above and implemented by 308 has $1.1 \times 10^6$ total parameters compared to Swanson's network which has $50 \times 10^6$ parameters. Per-sample inference times on an NVIDIA V100 GPU are 166 microseconds and 270 microseconds, respectively, for the ISNet network and Swanson's network. These are equivalent to maximum loop rates of 6 kHz versus 3.7 kHz if used in an adaptive optic system. In other words, the ISNet network described above and implemented by controller 308 could provide updated corrections to the adaptive mirror 302 at a higher rate than conventional systems allowing improved optical correction.

Described above is a system 300 that employs a deep convolutional network using the slope information and intensity information of a SH-WFS and outperforms conventional SH-WFS reconstruction algorithms. Controller 308 can be adapted to working with existing wavefront sensors and thus the convolutional network employed by controller 308 is immediately usable in many extant SH-WFS installations. Finally, the network employed by controller 308 requires little computational resource compared to other wavefront reconstruction algorithms and can be implemented in real-time applications.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for correcting distorted wavefronts, the system comprising:
    a beamsplitter configured to receive an incoming wavefront and split the incoming wavefront into a distorted wavefront and another distorted wavefront;
    a lens configured to receive the other distorted wavefront from the beamsplitter;
    an image sensor configured to receive the other distorted wavefront from the lens and generate intensity data corresponding to the other distorted wavefront;
    a wavefront sensor configured to receive the distorted wavefront and generate x-slope data and y-slope data corresponding to the distorted wavefront; and
    a controller configured to receive the intensity data from the image sensor and the x-slope data and y-slope data from the wavefront sensor, and generate a reconstructed wavefront using a trained neural network,
    wherein the neural network includes a plurality of encoder arms, a decoder arm, and a convolutional layer,
    wherein the intensity data, x-slope data, and y-slope data are input into the plurality of encoders arms, respectively,
    wherein data from the plurality of encoders arms is concatenated and provided to the decoder arm, and
    wherein data from the decoder arm is provided to the convolutional layer to produce the reconstructed wavefront.

2. The system of claim 1, further comprising:
an adaptive mirror comprising a plurality of reflecting elements.

3. The system of claim 2, wherein the controller is further configured to calculate a plurality of adjustments respectively corresponding to the plurality of reflecting elements based on the reconstructed wavefront, and cause the plurality of reflecting elements of the adaptive mirror to adjust in accordance with the plurality of adjustments.

4. The system of claim 1, wherein each encoder arm, of the plurality of encoder arms, includes a plurality of dense blocks and a plurality of downsampling blocks constructed to reduce a lateral size of data passing through the encoder arm.

5. The system of claim 1, wherein the decoder arm includes a plurality of upsampling blocks and dense blocks constructed to increase a lateral size of the data provided to the decoder arm.

6. The system of claim 1, wherein the wavefront sensor is a Shack-Hartmann wavefront sensor.

7. A method of correcting distorted wavefronts, the method comprising:
splitting, at a beamsplitter, an incoming wavefront into a distorted wavefront and another distorted wavefront, wherein the distorted wavefront is provided to a wavefront sensor and the other distorted wavefront is provided to a lens;
receiving, at the lens, the other distorted wavefront from the beamsplitter and focusing the other distorted wavefront onto an image sensor;
receiving, at the wavefront sensor, the distorted wavefront;
generating, at the wavefront sensor, x-slope data and y-slope data corresponding to the distorted wavefront;
generating, at the image sensor, intensity data corresponding to the other distorted wavefront;
providing the intensity data corresponding to the other distorted wavefront to the controller;
providing the x-slope data and y-slope data corresponding to the distorted wavefront to the controller;
generating, at a controller, a reconstructed wavefront using a trained neural network that includes a plurality of encoder arms, a decoder arm, and a convolutional layer by:
inputting the intensity data, the x-slope data, and the y-slope data into the plurality of encoder arms, respectively,
concatenating data output from the plurality of encoder arms,
providing concatenated data to the decoder arm, and
providing data from the decoder arm to the convolutional layer to produce the reconstructed wavefront.

8. The method of claim 7, further comprising:
calculating, at the controller, a plurality of adjustments respectively corresponding to a plurality of reflecting elements of an adaptive mirror based on the reconstructed wavefront; and
causing the plurality of reflecting elements of the adaptive mirror to adjust in accordance with the plurality of adjustments.

9. The method of claim 7, further comprising:
reducing, for each encoder arm of the plurality of encoder arms, a lateral size of data passing through the encoder arm using a plurality of dense blocks and a plurality of downsampling blocks.

10. The method of claim 7, further comprising:
increasing, at the decoder arm, a lateral size of the concatenated data provided to the decoder arm using a plurality of upsampling blocks and dense blocks.

11. The method of claim 7, wherein the wavefront sensor is a Shack-Hartmann wavefront sensor.

* * * * *